Figure 5:
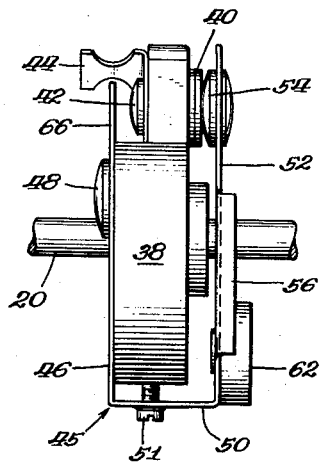

May 31, 1960  W. M. W. QUERFURTH  2,938,974
MOTOR SPEED GOVERNOR
Filed Oct. 19, 1956  2 Sheets-Sheet 1
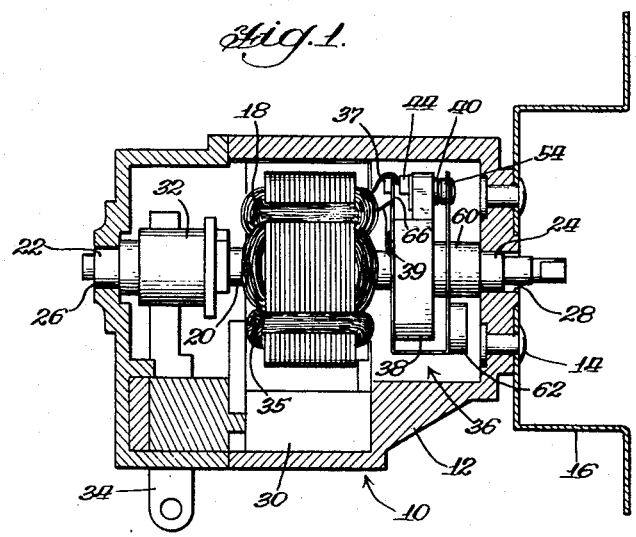
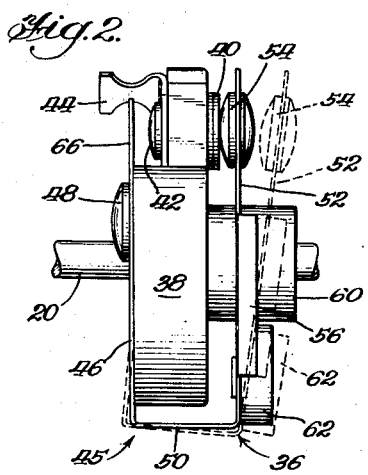
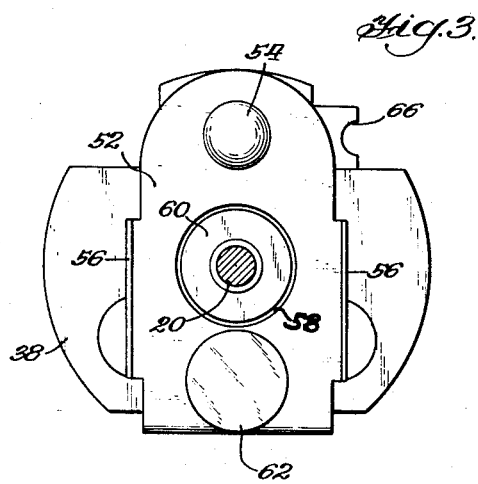
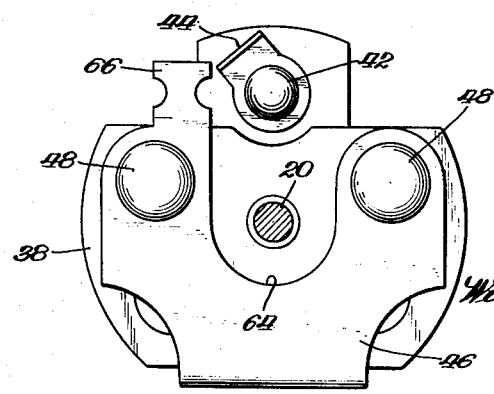
INVENTOR.
Wilhelm Max Wolfgang Querfurth
BY
Mueller and Aichele
Attys.

May 31, 1960 W. M. W. QUERFURTH 2,938,974
MOTOR SPEED GOVERNOR
Filed Oct. 19, 1956 2 Sheets-Sheet 2

INVENTOR.
Wilhelm Max Wolfgang Querfurth
BY
Mueller and Aichele
Attys.

United States Patent Office 2,938,974
Patented May 31, 1960

2,938,974
MOTOR SPEED GOVERNOR

Wilhelm Max Wolfgang Querfurth, Maywood, Ill., assignor to Motorola, Inc., Chicago, Ill., a corporation of Illinois Filed Oct. 19, 1956, Ser. No. 617,145

8 Claims. (Cl. 200—80)

This invention relates to new and useful improvements in motor speed governors and more particularly to a self-contained governor assembly which includes a centrifugally operated switch carried on a flywheel and mounted on the motor shaft within the housing of the motor.

In recent years, there has been developed a variety of very small fractional horsepower A.C. and D.C. motors which are used for a variety of purposes such as in search tuners for automobile radios. In small electric motors of this type, there is a necessity for an accurate control limiting the maximum speed of rotation of the motor.

It is therefore one of the objects of this invention to provide a new and improved motor assembly having a compact governor assembly within the motor housing.

Another object of this invention is to provide a motor-governor assembly in which the governor performs equally well for both directions of rotation of the motor shaft.

A further object of this invention is to provide an improved governor assembly which is simply and inexpensively manufactured and assembled and which is readily used in small, low priced motors.

Other objects of this invention will become apparent from time to time throughout the specification and claims as hereinafter related.

A feature of this invention is the provision of a governor assembly which is mounted within the motor housing for a small electric motor and which includes a centrifugal switch in which both contacts are rotated with the motor shaft and are opened at a predetermined speed to control one or more of the control circuits to the motor.

Another feature of this invention is the provision of a motor-governor assembly in which a centrifugally operated switch is mounted on a flywheel within the motor housing and with the switch contact arm extending diametrically across the flywheel so that the movement of the movable switch contact and the governor weight are both in a common plane with the axis of the motor shaft.

A further feature of this invention is the provision of a motor governor which is fully enclosed and not subject to friction, moisture, or excessive temperature and is thus less affected by wear than other types of speed governors.

A further feature of this invention is the provision of a means for varying the closing force on the centrifugally operated switch in a motor governor and thus controlling the speed of rotation at which the switch will be opened.

A still further feature of this invention is the provision of a snap-action mechanism in a centrifugally operated switch for a motor governor so that the switch is opened with a snap movement and a time delay is provided in the opening and closing of the switch contacts.

A still further feature of this invention is the provision in a motor speed governor of a centrifugally operated switch having a pair of switch contacts carried on a centrifugally operated switch contact arm so that one pair of switch contacts are opened and another pair of switch contacts are closed at a selected speed of rotation of the motor shaft and thereby establishing a different selected circuit arrangement at a selected speed of rotation of the motor shaft.

These and other features of this invention will become more apparent from the accompanying specification when considered with the attached drawings in which:

Fig. 1 is a view in longitudinal central section of an electric motor and governor assembly.

Figure 6:
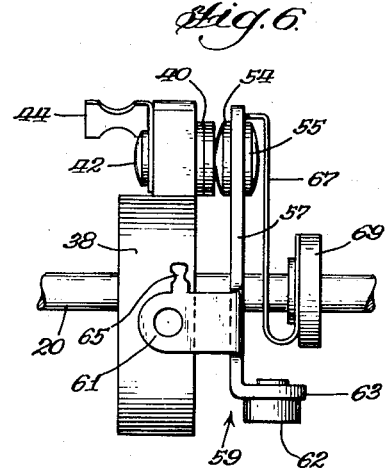
Figure 7:
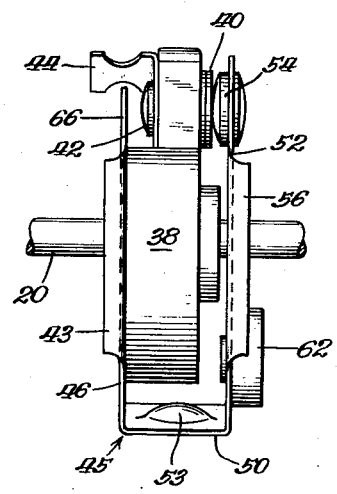
Figure 8:
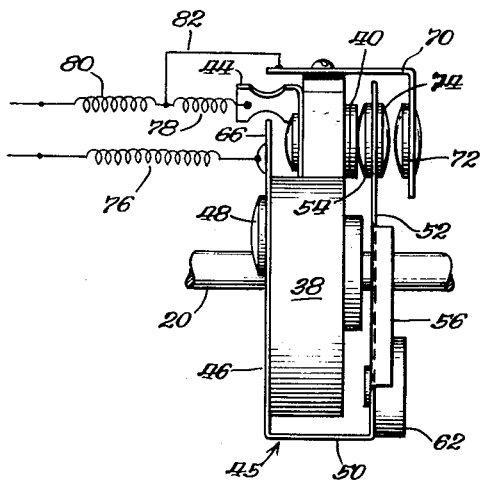

Fig. 2 is a detail view, slightly enlarged, of the governor assembly shown in Fig. 1, Fig. 3 is a detail view in right elevation of the governor assembly of Fig. 2, Fig. 4 is a detail view in left elevation of the governor assembly shown in Fig. 2, Fig. 5 is a detail view of a modification of the governor assembly shown in Fig. 2 in which an adjustment means is provided for the centrifugal governor switch, Fig. 6 is a detail view of a further modification of the governor assembly in which the centrifugal governor switch has a rigid contact arm, Fig. 7 is a further modification of the governor assembly, having a snap acting means provided therein, and Fig. 8 is a still further modification of the governor assembly, having a dual switch arrangement for switching between two different control circuits at a selected rotary speed of the motor.

This invention relates to an improved motor-governor assembly in which a centrifugal switch is mounted on a fly-wheel for an electric motor, and arranged to be actuated to open one of the motor circuits of a predetermined speed of rotation of the motor. The centrifugal switch is supported on a flywheel assembly, which is enclosed within the motor housing, along with the motor armature and rotor, and thus provides a compact, easily assembled motor governor assembly. This motor-governor assembly is also easily modified to provide an adjustment means for determining the speed of rotation at which the governor is actuated to provide a snap action of the governor switch, or to provide multiple circuit control through the use of a double acting switch or the like.

In Fig. 1 of the drawings, there is shown the motor-governor assembly 10, which has a housing 12 secured by rivets or the like 14 to a supporting plate 16. The housing 12 has a rotor 18 with a rotor shaft 20 supported in bearings 22 and 24 positioned in apertures 26 and 28 in opposite ends of the motor housing 12. The motor is provided with the usual field magnets 30 which may be electromagnets if desired, but which are shown as permanent magnets for this motor assembly. At one end of the rotor shaft 20 there is provided the usual slip ring assembly 32 which is connected to an external electrical conductor 34 for energizing the motor. At the other end of the rotor shaft 20 there is supported a governor assembly 36 which includes a centrifugally operated switch connected in circuit with the electric windings 35 of the rotor 18. The governor assembly 36 includes a flywheel 38 which is mounted on the rotor shaft 20 and held in place by a bushing 60 and carries the contacts 40, 54 for a centrifugal switch. The flywheel 38 is of an insulating material, such as molded thermoplastic, and has a switch contact 40 carried at the upper end thereof as shown in Fig. 2. The switch contact 40 is secured on the flywheel 38 by a rivet 42 which extends through the flywheel and also secures in place a connection tab 44 for making an electrical connection to the rotor windings 38. There is also supported on the flywheel 38 a U-shaped spring contact arm 45 having spaced parallel legs and a connecting base portion. The contact arm 45 has one leg 46 secured by rivets 48 to one face of the flywheel 38 and extending diametrically thereacross. The supporting leg 46 has a cut out central portion 64 which provides for passage of the shaft 20 and has a projecting portion 66 which provides a connecting lug or tab for completing the connection from the switch to the rotor windings 35. The U-shaped spring contact arm 45 has a base portion 50 connecting the leg 46 to a contact supporting leg 52. The contact supporting leg portion 52 extends diametrically across the flywheel 38, and is substantially parallel to the surface of the flywheel. The contact carrying leg 52 carries a switch contact 54 at the upper end thereof and is normally biased into contact with the switch contact 40 on the flywheel 38. The contact carrying leg 52 has edge portions 56 bent outward at right angles thereto to provide a stiffened portion of channel-shaped cross section. The contact carrying leg portion 52 has an aperture 58 therein which is slightly larger than the bushing 60 which holds the flywheel 38 in place. At the lower portion of the contact carrying arm 52 and located diametrically opposite the switch contact 54 is a governor weight 62 which responds to the centrifugal force of rotation of the rotor shaft 20 to open and close the switch contacts 40 and 54.

In operation this motor-governor assembly functions as a simple electric motor with a centrifugally operated switch which operates as a governor for the motor. The motor arrangement which is shown is a D.C. motor having permanent field magnets. The motor is energized through electrical connectors 34, only one of which is shown. The rotor 18 of the motor is energized through the winding 35 which has lead wires 37 and 39 connected to the connector tabs 44 and 66 for the centrifugal switch in the governor assembly. The contacts 40 and 54 in the centrifugal switch complete the circuit for the rotor winding 35 and when opened are operable to de-energize the rotor winding. The switch contact 54 which is carried on the contact carrying leg 52 is opened by action of centrifugal force on the governor weight 62 when the motor reaches a selected speed of rotation. As the speed of the motor increases, the centrifugal force on the governor weight 62 tends to throw this weight radially outward, and to deform the U-shaped contact carrying arm 45 in the manner indicated by the dotted position in Fig. 2. The speed at which the contacts 40, 54 are opened is determined by the spring force of the contact arm 45 which must be overcome by centrifugal force acting on the weight 62. As the governor weight 62 is thrown outward by centrifugal force and the contact carrying arm 45 deflected to the dotted position, the edge of the aperture 58 in the contact leg 52 will engage the bushing 60 and thus limit the extent of opening of the switch contacts. When the switch contacts 40, 54 are opened and the motor circuit is de-energized internal friction and external load on the motor cause the rotor to slow down until the inherent bias of the contact arm 45 causes the contact 40, 54 to close again.

This speed governor is particularly effective since both of its contacts rotate and since all of its parts are mounted on and affixed to the motor shaft. By having all of its parts affixed to the motor shaft the governor performs independently of axial movements, a feature which permits its use in low-priced motors, because it does not necessitate the use of expensive thrust bearings. In this governor the motion of the movable contact 54 occurs substantially parallel to the axis of rotation of the rotor shaft 20 and the outward motion of the governor weight 62 occurs in a common plane with the axis of the motor shaft 20, thereby assuring equal performance of the governor for both directions of turn and making its use effective for reversible motors.

While the description of this motor-governor assembly has been with particular emphasis upon a D.C. motor, it is to be understood that it is equally effective for controlling the rotor circuit for A.C. motors as well. It is also to be understood that this governor assembly is operative to control the stator circuit for either D.C. or A.C. motors, using a conventional slip ring arrangement for connecting the centrifugal switch to the stator windings. It should also be understood that while there is shown only one pair of switch contacts additional contacts may be provided on the flywheel and on the switch contact arm to open other windings in the motor circuit.

In Fig. 5 of the drawings, there is shown a modification of the governor assembly of Fig. 2. In this modification, the various parts of the governor assembly which are identical in size, shape and function, are given the same reference numerals as their counterparts in Fig. 2. In this modification there is provided an adjustment screw 51 which extends through the base portion 50 of the contact carrying arm 45, and into the lower portion of the flywheel 38. The adjustment screw 51 is operable to vary the tension of the spring contact carrying arm 45 to vary the speed of response of the centrifugally operated switch. When the screw 51 is adjusted to provide a higher force on the spring contact arm 45 a larger centrifugal force on the governor weight 62 is required to move the switch contact 54 away from the contact 40. By this adjustment of the screw 51, the speed of response of the centrifugal switch is adjusted accordingly.

In Fig. 6 there is shown a modification of the governor assembly in which the movable contact 54 is mounted on a separate contact carrying lever arm. In this governor assembly the flywheel 38 is mounted on the rotor shaft 20 and supports a fixed contact 40 and a contact connection tab 44 held in place by a rivet 42, as in Figs. 1 to 5. In this modification the switch contact 54 is connected as by a rivet 55 on one arm 57 of a bell crank lever 59. The bell crank lever 59 is pivotally connected as at 61 to the flywheel 38. The lever 59 has an outturned arm portion 63 on which the governor weight 62 is mounted. A connection tab 65 is also provided as part of the lever arm 57. The lever arm 57 and contact 54 are biased toward engagement with the fixed contact 40 by a spring 67 which is secured on an adjustably movable and insulated bushing 69.

In operation, the connection tabs 44 and 65 are connected to lead wires from the circuit of the motor rotor or stator. The rotation of the governor assembly will cause the governor weight 62 to be thrown radially outward and thus rotate the bell crank lever 59 about the pivot 61 to open the switch contacts 40 and 54. The speed of rotation of the motor at which the switch contacts are opened is determined by the force of the spring 67 which urges the contacts toward a closed position. The force exerted by the spring 67 may be varied by adjustment of the bushing 69 longitudinally on the rotor shaft 20. This adjustment may be made while the motor is at rest or in motion to cause the switch contacts to be opened at any desired speed of rotation of the motor. As in the case of the other embodiments of this invention when the switch contacts are opened and the motor circuit temporarily de-energized, the motor will be slowed either by internal friction, or by the external load on the motor, until the switch contacts close and re-energize the motor circuit.

In Fig. 7 there is shown another embodiment of this invention in which the governor assembly as shown in Figs. 1 to 4, is provided with a snap acting structure for causing a time delay in the opening as well as closing of the switch contacts. In this embodiment of the invention, all parts which are substantially identical in size, position and function, are given identical reference numerals to their counterparts in Figs. 1 to 4. In this embodiment of the invention, the leg 46 of the contact arm assembly 45 is provided with outturned edge portions 43, which stiffen the leg 46 to prevent its being flexed away from the flywheel 38. The base portion 50 of the contact arm assembly 45 is provided with an indentation 53 which causes the base portion 50 to be flexed with a snap action.

In the operation of this embodiment of the governor assembly, the switch contacts 40 and 54 are opened by centrifugal movement of the governor weight 62, as in the other embodiments of the invention. In this form of the invention, however, the movement of the governor weight 62 is accomplished by a flexure of the base portion 50 of the contact arm assembly 45. The indentation 53 in the base portion 50, requires the application of a greater amount of force to open the switch contacts and causes the contacts to be opened with a snap action. Once the contacts are opened, however, a smaller amount of force is required to keep them open. This arrangement, therefore, provides for a time delay in the opening and closing of the switch contacts due to the difference in rate of rotation of the governor assembly at which the contacts are opened and at which the contacts are closed.

In Fig. 8 there is shown a still further modification of the governor assembly of Figs. 1 to 4 in which there is provided a second set of contacts which are actuated by the centrifugal governor weight 62. In this modification of the invention, the flywheel and most of the centrifugal switch assembly are comprised of parts which are identical in Figs. 1 to 5, and which have the same reference numerals as in the other figures. In this embodiment of the invention there is provided an L-shaped arm 70 carrying a fixed contact 72 which is spaced from the fixed contact 40 on the flywheel 38. The leg 52 of the contact arm assembly 55, is provided with an additional contact 74, which is engageable with the fixed contact 72. The movement of the leg 52 by the governor weight 62 is therefore operable to open the contacts 40 and 54 and to close the contacts 72 and 74. The governor assembly is shown with the connector lug 66 diagrammatically connected to one winding 76 of the rotor or stator of the electric motor. The connector lug 44 is shown diagrammatically as being connected to winding 78 and 80 of the motor. The contact carrying arm 70 is connected by a lead wire 82 to a point between the windings 78 and 80.

This form of governor assembly is operated in response to centrifugal force on the governor weight 62 as in the case of the other embodiments of this invention. In this embodiment of the invention, however, instead of merely opening the contacts 40 and 54 the action of centrifugal force on the governor weight 62 is operable to open the contacts 40 and 54, and to close the contacts 72 and 74 to establish a different circuit arrangement for the motor. This arrangement may be used to shorten one or more turns of one of the motor circuits to introduce such a severe load that the range of operating voltage or operating load versus constant speed will be substantially extended. This arrangement is preferably used with motors which are turned on and off for short intervals since the excessive load will cause the motor windings to heat excessively. The snap action arrangement shown in Fig. 7 is especially effective in this double throw switch arrangement.

I claim:

1. In a motor assembly which includes a rotor having an electric circuit, and a rotary shaft for said rotor; a governor assembly coupled to the shaft for controlling the electric circuit including in combination, a flywheel of an insulating material adapted to be rotated by the shaft, said flywheel having a pair of opposite faces, a switch contact mounted on one of the faces of said flywheel, a U-shaped spring contact arm having two spaced legs and a connecting base portion, said contact arm having one leg secured to the other face of said flywheel and extending diametrically thereacross and having its other leg extending parallel thereto and diametrically across said one face of said flywheel, a switch contact carried on said other leg of said contact arm and normally biased thereby into contact with said first named contact, and a governor weight mounted on said contact arm and operable to move the same to open said contacts at a selected rotary speed of said flywheel.

2. In a motor assembly which includes, a rotor having an electric circuit, and a rotary shaft for said rotor; a governor assembly coupled to the shaft for controlling the electric circuit including in combination, a flywheel of an insulating material adapted to be rotated by the shaft, said flywheel having a pair of opposite faces, a switch contact mounted on one of the faces of said flywheel, a U-shaped spring contact arm having two spaced legs and a connecting base portion, said contact arm having one leg secured to the other face of said flywheel and extending diametrically thereacross and having its other leg extending parallel thereto and diametrically across said one face of said flywheel, a switch contact carried on said other leg of said contact arm and normally biased thereby into contact with said first-named contact, a governor weight mounted on said contact arm and operable to move the same to open said contacts at a selected rotary speed of said flywheel, and said other leg having an opening therein through which the shaft extends and the edge of said opening being engageable with the shaft to determine the maximum movement of said switch contact arm by said governor weight.

3. In a motor assembly which includes, a rotor having an electric circuit, and a rotary shaft for said rotor; a governor assembly coupled to the shaft for controlling the electric circuit including in combination, a flywheel of an insulating material adapted to be rotated by the shaft, said flywheel having a pair of opposite faces, a switch contact mounted on one of the faces of said flywheel, a U-shaped spring contact arm having two spaced legs and a connecting base portion, said contact arm having one lege secured to the other face of said flywheel and extending diametrically thereacross and having its other leg extending parallel thereto and diametrically across said one face of said flywheel, a switch contact carried on said other leg of said contact arm and normally biased thereby into contact with said first named contact, a governor weight mounted on said other leg of said contact arm adjacent the base portion thereof and operable to move the same to open said contacts at a selected rotary speed of said flywheel, and a threaded adjustment member extending through said base portion into said flywheel and adjustable to vary the bias of said contact arm.

4. In a motor assembly which includes, a rotor having an electric circuit, and a rotary shaft for said rotor; a governor assembly coupled to the shaft for controlling the electric circuit including in combination, a flywheel of an insulating material adapted to be rotated by the shaft, said flywheel having a pair of opposite faces, a switch contact mounted on one of the faces of said flywheel, a U-shaped spring contact arm having two spaced legs and a connecting base portion, said contact arm having one leg secured to the other face of said flywheel and extending diametrically thereacross and having its other leg extending parallel thereto and diametrically across said one face of said flywheel, a switch contact carried on said other leg of said contact arm and normally biased thereby into contact with said first named contact, means stiffening the legs of said contact arm so that movement of the contact carrying leg is caused by flexing said base portion, a governor weight mounted on said other leg of said contact arm adjacent the base portion thereof and operable to move the same to open said contacts at a selected rotary speed of said flywheel, and said base portion having an indentation therein providing a snap-movement of the contact carrying leg and a timed delay in the opening and closing of the switch contacts.

5. In a motor assembly which includes, a rotor having an electric circuit, and a rotary shaft for said rotor; a governor assembly coupled to the shaft for controlling the electric circuit including in combination, a flywheel of an insulating material adapted to be rotated by the shaft, said flywheel having a pair of opposite faces, a switch contact mounted on one of the faces of said flywheel, a supporting member supported on said flywheel adjacent said contact and extending outwardly in a common plane with the axis of said shaft and having a switch contact supported thereon aligned with and spaced from said first named contact, a U-shaped spring contact arm having two spaced legs and a connecting base portion, said contact arm having one leg secured to the other face of said flywheel and extending diametrically thereacross and having its other leg extending parallel thereto and diametrically across said one face of said flywheel, the upper end of said other leg extending between said switch contacts, a pair of oppositely facing switch contacts carried on the upper end of said other leg of said contact arm and movable between said first named and said second named contacts but normally biased into contact with said first-named contact, and a governor weight mounted on said contact arm and operable to move the same away from said first named contact and into contact with said second named contact at a selected rotary speed of said flywheel.

6. A governor assembly including in combination, rotary means including a flywheel of insulating material on an elongated motor shaft, said flywheel having first and second opposite faces perpendicular to said shaft, a movable contact carrying arm including a stiff substantially flat strip extending along a diameter of said first face in spaced parallel relation therewith, an L-shaped spring having a leg portion extending parallel to said contact carrying arm and fastened to said shaft on a portion thereof spaced from said first face of said flywheel, said spring having a connecting portion extending perpendicularly from said leg portion to one end of said contact carrying arm so that said spring and said arm have a U-shape, fastening means pivotally connecting said contact carrying arm to said flywheel, said spring resiliently biasing said movable contact carrying arm to a first position adjacent said first face and permitting movement of said arm away from said first face to a second position, an adjustable bushing secured to said shaft and rotating therewith, said bushing engaging said spring and being movable toward and away from said first face of said flywheel to control the tension of said spring for adjusting the bias of said contact carrying arm, a movable switch contact on said contact carrying leg, a fixed switch contact supported by said flywheel adjacent said first face and aligned with said movable switch contact, and a governor weight on said contact carrying arm for moving the same from said first position to said second position at a selected rotary speed of said flywheel, said movable switch contact engaging said fixed switch contact in one of said first and second positions of said contact carrying leg.

7. A governor assembly including in combination, rotary means including an elongated motor shaft and a flywheel of insulating material attached thereto, said flywheel having first and second parallel faces extending perpendicular to said shaft, a U-shaped contactor supported by said flywheel and including an elongated substantially flat strip extending longitudinally in spaced parallel relation with a diameter of said first face, said strip having a central opening therein through which said shaft extends with said strip extending in opposite directions from said opening, said contactor further including an L-shaped spring having a flat leg portion extending parallel to said strip and spaced from said strip in the direction of said shaft, said spring further including a connecting portion extending between one end of said leg portion and one end of said strip in perpendicular relation therewith so that said spring and said strip have a U-shape, means connecting the other end of said flat leg portion of said spring to a portion of said rotary means spaced from said first face of said flywheel in the direction of said shaft, said strip being movable toward and away from said first face of said flywheel between first and second positions, and said spring resiliently biasing said strip to said first position, a governor weight supported by said strip and exerting a force thereon for moving the same from said first position to said second position at a selected rotary speed of said rotary means, a fixed switch contact supported by said flywheel adjacent said first face thereof, and a movable switch contact supported by said strip and engageable with said fixed switch contact in one of said first and second positions of said strip.

8. A governor assembly including in combination, rotary means including an elongated motor shaft and a flywheel of insulating material attached thereto, said flywheel having first and second parallel faces extending perpendicular to said shaft, a U-shaped contactor supported by said flywheel and including an elongated substantially flat strip extending longitudinally in spaced parallel relation with a diameter of said first face, said strip having a central opening therein through which said shaft extends with said strip extending in opposite directions from said opening, said contactor further including an L-shaped spring having a flat leg portion extending parallel to said strip and spaced from said strip in the direction of said shaft, said spring further including a connecting portion extending between one end of said leg portion and one end of said strip in perpendicular relation therewith so that said spring and said strip have a U-shape, means connecting the other end of said flat leg portion of said spring to a portion of said rotary means spaced from said first face of said flywheel in the direction of said shaft, said strip being movable toward and away from said first face of said flywheel between first and second positions, said spring resiliently biasing said strip to said first position, and said shaft having a stop surface positioned to be engaged by an edge of said strip at said opening therein to stop said strip at said second position thereof, a governor weight supported by said strip and exerting a force thereon for moving the same from said first position to said second position at a selected rotary speed of said rotary means, a fixed switch contact supported by said flywheel adjacent said first face thereof, and a movable switch contact supported by said strip and engageable with said fixed switch contact in said first position of said strip.

References Cited in the file of this patent

UNITED STATES PATENTS

| | | |
|---|---|---|
| 1,855,703 | Cloud | Apr. 26, 1932 |
| 1,870,896 | Danner | Aug. 9, 1932 |
| 1,984,512 | Anderson | Dec. 18, 1934 |
| 2,048,494 | Diel | July 21, 1936 |
| 2,084,907 | Groot | June 22, 1937 |
| 2,098,226 | Charter | Nov. 9, 1937 |
| 2,438,810 | Lambert | Mar. 30, 1948 |
| 2,617,904 | Anderson | Nov. 11, 1952 |
| 2,719,945 | Tull | Oct. 4, 1955 |
| 2,762,229 | Coning et al. | Sept. 11, 1956 |
| 2,748,333 | Lee | May 29, 1956 |
| 2,794,163 | Hall et al. | May 28, 1957 |